United States Patent [19]

Petershack

[11] 4,263,779
[45] Apr. 28, 1981

[54] PIN FOR RIVETLESS CHAIN

[75] Inventor: Victor D. Petershack, Elm Grove, Wis.

[73] Assignee: Rexnord Inc., Milwaukee, Wis.

[21] Appl. No.: 26,714

[22] Filed: Apr. 4, 1979

[51] Int. Cl.³ .................. B21L 9/04; F16G 13/08
[52] U.S. Cl. ............................... 59/8; 59/12; 59/78; 59/84; 474/206; 474/219; 474/227
[58] Field of Search .............. 59/8, 10, 12, 35, 78, 59/84, 85, 90; 198/853; 74/245 C, 245 R, 245 LP, 245 P, 248, 249, 250 R, 250 C, 251 C, 252, 254, 255 R, 258; 474/206, 207, 219, 227

[56] References Cited

U.S. PATENT DOCUMENTS

| 365,123 | 6/1887 | Garland | 74/254 |
|---|---|---|---|
| 1,448,663 | 3/1923 | Hoya | 59/78 |
| 1,560,646 | 11/1925 | Belcher | 74/458 |
| 1,899,948 | 3/1933 | Fahrenwald | 59/78 |
| 2,298,604 | 10/1942 | Webb | 74/254 |
| 2,450,565 | 10/1948 | Saifyrd | 74/250 |
| 2,751,791 | 6/1956 | Harris | 74/254 |
| 2,860,520 | 11/1958 | Sull | 74/250 R |
| 2,889,866 | 6/1959 | Braun | 59/35 |
| 3,742,863 | 7/1973 | Rosenberger | 74/254 |
| 4,020,712 | 3/1977 | McKeon | 74/250 R |

FOREIGN PATENT DOCUMENTS

| 316926 | 12/1919 | Fed. Rep. of Germany | 74/250 R |
|---|---|---|---|
| 430397 | 2/1948 | Italy | 59/78 |

*Primary Examiner*—Francis S. Husar
*Assistant Examiner*—Gene P. Crosby

[57] ABSTRACT

A T-headed pin for use in rivetless chain, generally of the trolley conveyor type, is disclosed. The pin can entirely replace the conventional forged pin of any ordinary size and has superior design matching abilities. It is unique in that it is constructed entirely from a flat piece of sheet metal. Rectangular metal blanks with paired oppositely projecting tabs are provided. The blank is first curled to form the body of the pin with the tabs projecting endwise therefrom. In automated manufacture of chain of the type mentioned in selected lengths, the links may be readily assembled with curled pins having tabs projecting axially from both ends. The tabs may then be bent as required to complete the chain length. Alternatively, the tabs at one end only may be bent and lengths of chain may be readily assembled by inserting the other end of each pin into place and then bending the tabs at said other end. In the manufacture of the pins separately of chain assembly, the curled pin with projecting tabs is supported between two members of the exact width required between the T-heads of the finished pin. Opposite curling tools then move toward the tabs and form them in a sequence of steps which prevents or reduces tearing of the metal of the edges of the tabs where they merge into a curled portion forming the pin. Alternatively, the tabs may be bent prior to curling or partially bent prior to curling followed by a complete bending.

25 Claims, 14 Drawing Figures

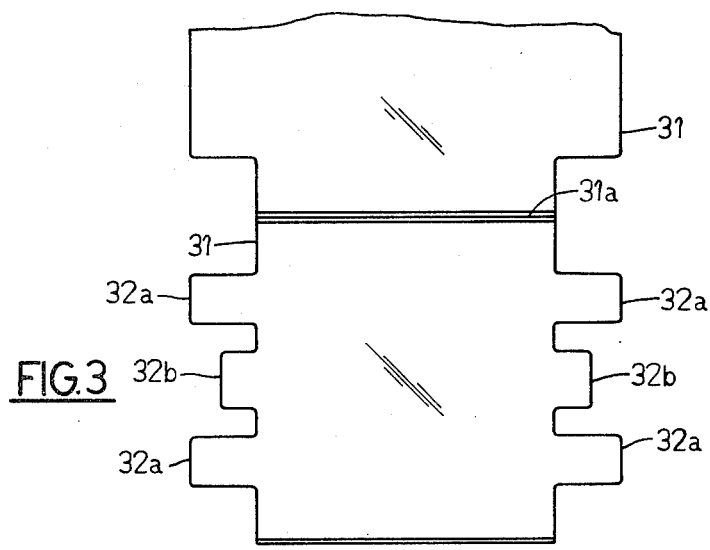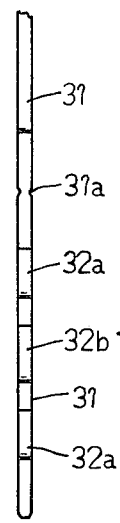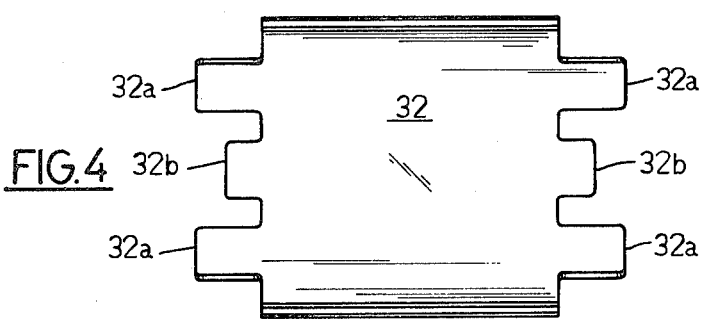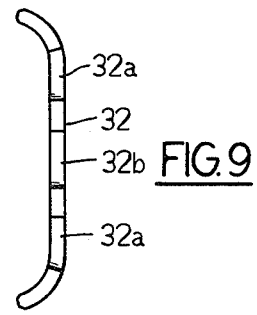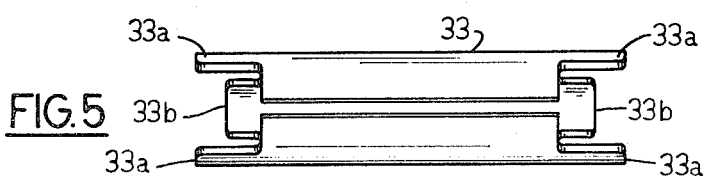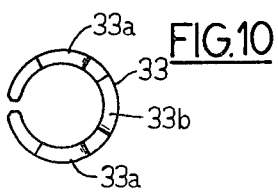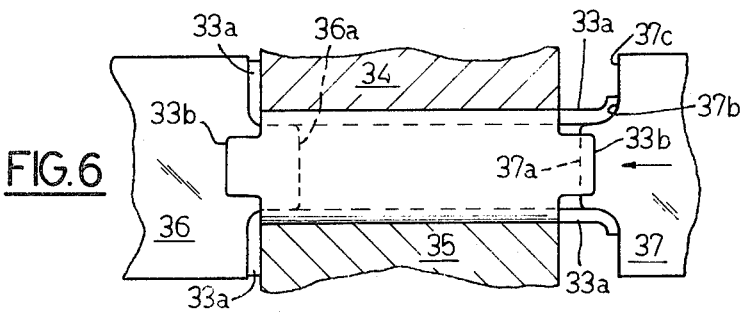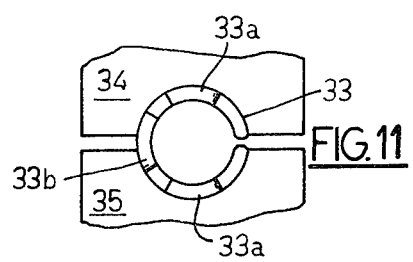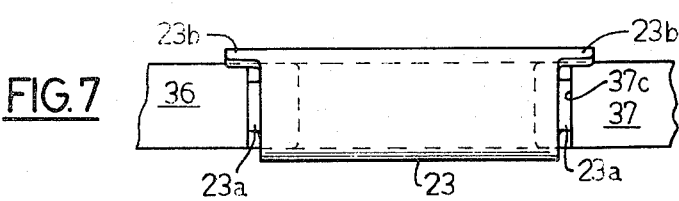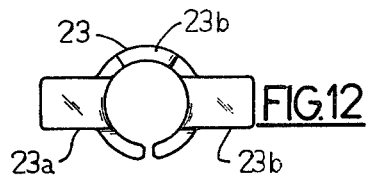

PIN FOR RIVETLESS CHAIN

BACKGROUND OF THE INVENTION

The particular type of chain which includes T-headed pins comprises pin links and center links which, with the pins, are designed to allow the chain to be assembled and disassembled without tools. Most commonly, such chain is used in trolley conveyors and is generally of drop forged iron alloy construction. Recently the links of some chain for use in food processing plants has been of an injection molded engineering plastic. While the tensile strength of such chain is considerably less than that of a comparable chain of drop forged construction, the links are more readily cleaned and do not corrode.

In attempting to provide suitable pins of stainless steel for use in such chain it was discovered that T-headed pins could be made from flat steel strip having a smooth prepared surface, rather than forged of an iron alloy. That is, each T-head of a drop forged pin comprises oppositely projecting tabs or ears of a width which conventionally approaches but does not exceed the diameter of the pin. Tabs of less width and also which project radially of the pin but somewhat angularly of each other are also readily provided by the present invention.

U.S. Pat. No. 2,298,604 shows the trolley conveyor type of chain which has been referred to. A typical drop forged pin is shown as prior art in this application and as will be further described, the pin body has axial, oppositely disposed ridges.

It is an object of the present invention to provide a pin which does not have such ridges and has a smooth surface finish as formed.

It is further an object of the invention to reduce the amount of metal required to comprise the pin.

Another object is to reduce the chain clearance requirements by reducing the required thickness of the tabs.

Another object is to allow the closing seam to be placed out of contact with the moving bearing surface.

Another object is to provide a hollow pin through which attachment bolts or rods may be extended.

In the manufacture of such chain in selected lengths, all the links of each length must be assembled in the same manner which is provided for later without tools. Such assembly of entire lengths for initial manufacture has been unavoidably time consuming, and a large part of the first cost of the chain. The present invention allows such lengths of chain to be assembled with automatic or semiautomatic equipment, or even by hand, at great savings.

OTHER ADVANTAGES OF THE INVENTION

The pins may be manufactured from strip stock in a variety of materials. The curling process is highly developed and efficient technology which permits refined selection of sizes and materials to fit varying use requirements. A considerable reduction in the amount of material and energy is achieved to provide the full equivalent of any prior art T-headed pins, notably of drop forged construction. The tabs forming the T-heads may be and are relatively small so that where possible the corresponding dimensions of the pin link may be reduced.

SUMMARY OF THE INVENTION

Flat blanks are first stamped from a steel strip. The blanks are rectangular and have spaced projecting tabs. Each blank is curled to a cylindrical form to comprise the shank of a pin and with the tabs extending endwise therefrom. The tabs at each end are then bent 90° in opposite directions to form a T with the curled shank. In one form of the invention the blank is stamped with a shorter tab intermediate the two tabs at each end. These shorter tabs are curled and project axially to provide end bearing surfaces such as for the parts of a bolt which may be extended through the pin.

DESCRIPTION OF THE SEVERAL VIEWS OF THE DRAWINGS

FIGS. 3–12 show the progressive formation of the pin from a flat steel strip.

FIG. 3 shows the end of the strip as it is blanked;

FIG. 4 shows the blank cut off and initially curled;

FIG. 5 shows the curled blank;

FIG. 6 shows the curled blank held between two dies (in section). The bending of the tabs in an intermediate stage is shown at the right and in its final stage at the left;

FIG. 7 shows the pin turned 90°.

FIGS. 8–12 are end views of the blank and the pin of FIGS. 3–12 respectively.

DESCRIPTION OF THE EMBODIMENT SHOWN IN THE DRAWINGS

Figure 1:
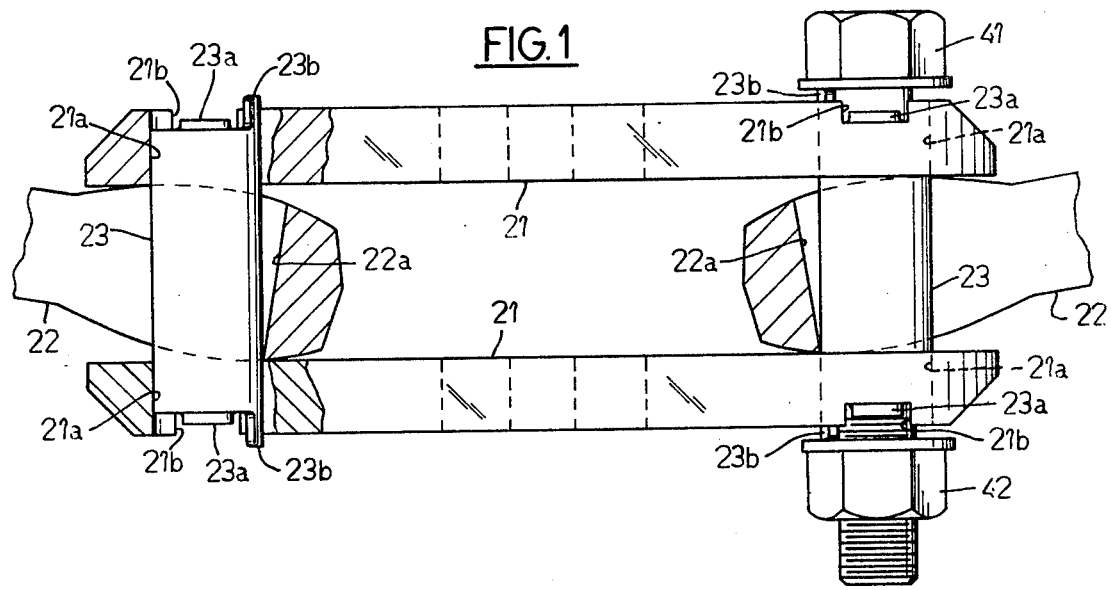
FIG. 1 shows a pin link assembly in side elevation with portions of the pin links at the left broken away and sectioned to show the ends of the pin. The intermediate ends of the two adjacent center links are broken away and sectioned also to show the pins. The relative angularity of the several links shows the side flexing which allows the chain to travel in an inclined upward or downward direction. A bolt is shown passing through the pin at right for an attachment, now shown.
Figure 2:
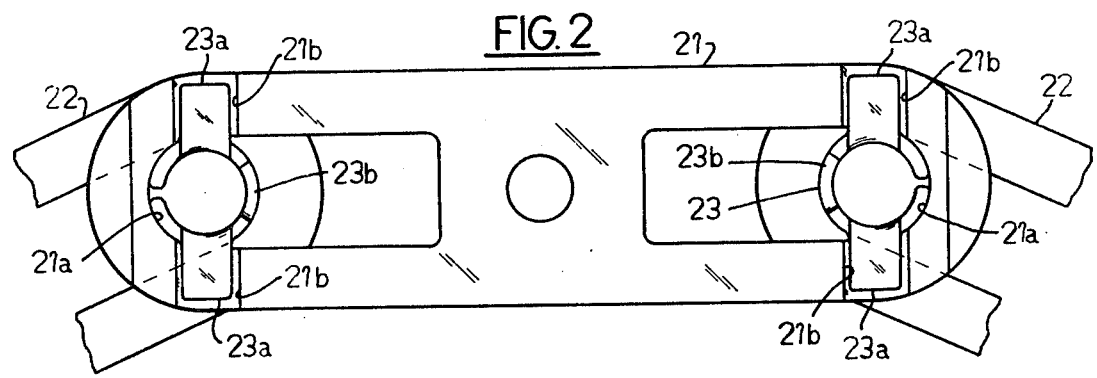
FIG. 2 is a plan view of the links of FIG. 1 as they would fit over a sprocket, not shown.

The chain of FIGS. 1 and 2 includes the pin links 21, the center links 22 and the pins 23. Each chain joint includes the corresponding ends of two links 21 and the intermediate end of a center link and a pin 23. A semi-cylindrical pin bearing area 22a is provided at each end of each link 22 and the two areas 22a of each link define the ends of a slot extending the length of the link. The wider ends of each link 22 as viewed in FIG. 1 space the pin links 21. The intermediate section of the link is relatively narrow to receive a mounting bracket, not shown, which may extend through the slot.

Each pin link 21 has a slot extending from the center section of the link to the semi-cylindrical bearing area 21a at each end of the link. Each of the two slots are of sufficient length to allow the T-head of a pin 23 to be passed therethrough for the assembly and disassembly of the chain. In the assembled chain, the two oppositely extending tabs 23a at each end of a pin 23 fit in the two upward and the two downward facing recesses 21b (as viewed in FIG. 1) provided at the corresponding ends of the two links 21.

The tabs 23a hold the two links 21 together as an assembly and as required and their positioning in the recesses prevent both movement and rotation of each pin 23 relative to either pin link 21. However, the adjacent center link 22 may either or both rotate on pin 23 as shown in FIG. 2 for the articulation of the chain or pivot on pin 23 as shown in FIG. 1.

The disassembly of the chain at any selected chain joint may be accomplished in the usual manner. Briefly, the center link 22 is shifted on pin 23 to locate the narrower center section of link 22 between the ends of links 21 and place the slots of links 21 and 22 in some registry. The ends of links 21 may then be brought together just sufficiently to release tabs 23a from recesses 21b and the pin 23 may be withdrawn through the slots. The reassembly of chain follows the reverse procedure.

According to the present invention the pin 23 is of stamped and curled construction and such construction not only provides certain economies of manufacture, but also an unexpected economy in the manufacture of the chain as well as other advantages.

FIG. 3 shows in plan the end portion of a steel strip 31 which has been scored as at 31a and blanked for subsequent cut-off. The end of the strip has opposite bevels which were formed by the previous scoring.

The blank 32 as cut off from strip 31 has beveled sides and opposite ends. The blank at each end thereof is provided with the tabs 32a and optionally with the shorter intermediate tab 32b. Preferably before or after cut-off, the portions of blank 32 adjacent its beveled sides are curled as shown in FIG. 9. This facilitates the subsequent curling of the blank to a fully circular cross-section as shown in FIG. 10.

The curled blank 33 is shown in FIGS. 5 and 10 and includes the curled tabs 33a and 33b which project axially. Any of various details or methods may be employed in providing the curled blank 33. The dies 34 and 35 of FIG. 10 may be used for curling. The seam between the adjoining beveled edges of the blank as shown in FIGS. 5 and 10 is not closed for certain purposes as will be described according to the present invention.

As shown in FIGS. 6 and 11, the curled blank 33 with curled projecting tabs is held between the opposed dies 34 and 35 and between the forming members 36 and 37. As shown at the right of FIG. 6, the member 37 includes a nose portion 37a which enters the curled blank 33 and also includes very precisely curved surfaces 37b which engage first the ends of tabs 33a. As the member 37 moves to the left as shown, the tabs 33a are driven along the flat forward faces 37c as they are progressively bent in conforming to the surfaces 37b.

As shown in FIG. 6 at the left, member 36 presses the tabs 33a against dies 34 and 35 to flatten the tabs 33a so that they lie in the same plane. It may be preferable that both members 36 and 37 press the tabs 33a against dies 34 and 35 at the same time for that purpose.

The completed pin 23 is shown in FIG. 7 prior to withdrawal of members 36 and 37. If the shorter projecting tabs 23b are provided at each end of the pin as shown, they remain curled and unbent. The bent tabs 23a at each end of the pin form the T-head at each end for the purposes described. The pins 23 are hollow and are adapted to receive attachment bolts if desired. Such a bolt 41 is shown in FIG. 1 having a nut 42 and suitable washers intermediate the bolt head and the nut. The tabs 23a of each pin 23 preferably lie entirely within the recesses 21b such that tightening bolt 41 would push the links together and bind the chain joint. The two projections 23b extend sufficiently to space the washers and provide a secure fastening for the bolt.

The present invention especially includes an improvement in the type of chain shown in the drawings which greatly reduces the cost of its manufacture. While assembly and disassembly of the chain at any given joint is in fact relatively quick and easy, such assembly of the chain by hand in ten-foot lengths as is usual, or in other lengths for shipment is a considerable part of the manufactured cost of the chain. Apparatus for performing the required manipulation of the links has not been attempted by anyone insofar as is known.

Figure 13:
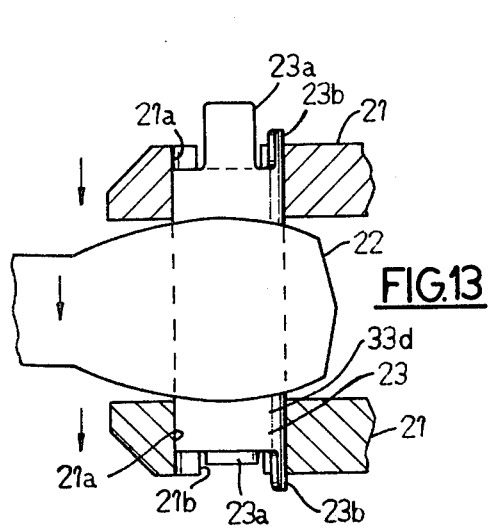
FIGS. 13 and 14 show methods of assembling the chain in manufacture with partially completed pins.
Figure 14:
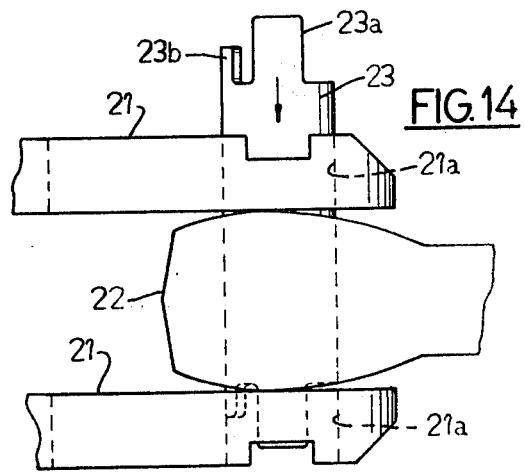

A very novel method of assembling such chain on a table (not shown) is illustrated in FIGS. 13 and 14. In FIG. 13, the curled blank 33d is provided with bent tabs 33a at one end only and is held upright and one of the pin links 21 is placed thereover. A center link 22 and the other pin link are then added. A fixture, now shown, then clamps the links to secure the blank 33d in a manner similar to the securement by dies 34 and 35 (see FIG. 6) and a curling member (not shown) then descends to bend the upper tabs into the recesses of the upper pin link. In the method illustrated in FIG. 14, the several links are assembled and the curled blank 33 is inserted endwise therethrough. The tabs 33a at both ends of the pin are then bent as has been described.

Preferably, of course, the pins 23 are positioned so that the pin bearing surfaces 22a of the center links do not operate across the seams of the pins. Alternatively, the tabs 23a and the recesses 21b may be disposed at an angle other than 180°. Various other means, not shown, also may be optionally provided which will not allow assembly of the chain with pins 23 except as described.

The design flexibility which the present invention allows has been indicated. For example, a chain for use in a food processing plant should be non-corrosive and must be readily cleaned. For such use, links 21 and 22 may be of a molded homopolymer acetal resin such as is sold under the trademark "Delrin". The pins 23 for such a chain would very well be of stainless steel, such as #304 or #406. Such pins 23 might have an especially open seam as in the order of one-sixteenth of an inch (1.58mm) and from which material could be dislodged by steam cleaning. In another environment which is not critical but where the chain must carry a considerable load, the links 21 and 22 may be of a drop-forged iron alloy construction, as are most such chains presently. Pins 23 for such chain may readily be formed of a low-alloy, relatively ductile carbon steel and heat treated after forming.

The tabs of a drop-forged pin have a width equal to the diameter of the pin because of the forging method and are "over designed" in that respect. The present invention allows the tabs 23a to be of only such width which is required to hold the pin links together. This width should and in any case may be less than the internal diameter of the curled pin 23. However, the curling of the tabs 23a where they join the cylindrical portion of the pin may be a critical area in the manufacture of pins of some materials. Where that is the case and where some tearing may occur in bending the tabs, the tabs may be arched in cross-section rather than flat as shown. That is, the tabs at opposite ends of the pin may present concave, oppositely facing surfaces. Also, the portion of each tab which merges with the pin should be smooth and rounded and progressively wider.

Various embodiments of the invention may be employed within the scope of the accompanying claims.

I claim:

1. A T-headed pin for rivetless chain and the like comprising a curled shank having a single axial seam and further comprising at each end of the pin oppositely projecting tabs extending radially of the shank, the ends of the seam being intermediate the tabs and said shank and tabs being of integral stamped and bent construction.

2. The pin of claim 1 which is hollow and adapted to receive a bolt for the support of an attachement to the chain.

3. The pin of claim 1 which is of a stainless steel of the desired corrosion resistance.

4. The pin of claim 3 which is adapted to be incorporated in a chain including links of a non-corrosive material.

5. The pin of claim 1 which includes tabs at each end thereof which are angularly related in that they are disposed at substantially 180° with respect to each other and are bent to right angular positions respecting the axis of the pin.

6. The pin of claim 1 which is of carbon steel and has a shank which has been heat treated for greater strength after the shank and the tabs have been bent.

7. The pin of claim 1 wherein each tab is of a given width for most of its length and is of a maximum width in the region where the tab joins the pin, said maximum width being not greater than the internal diameter of the pin.

8. The pin of claim 7 wherein each tab is arched such that it has a curved cross-section.

9. The pin of claim 1 wherein the corners between the outer surface of the pin and the edges defining the seam are rounded.

10. The pin of claim 2 which further includes at each end a flat support surface which lies between the oppositely projecting tabs.

11. The pin of claim 10 wherein said surface at each end is engageable by means associated with a bolt which may be extended through the pin.

12. The improved method of making T-headed pins in series from a flat metal strip which comprises the steps of selecting a strip of material of the desired surface smoothness, metallurgical and physical characteristics, progressively notching the edges of said strip to form projecting tabs, shearing a blank from the end of the strip, curling the blank, to form the pin about the axis thereof and bending the tabs to right angular positions respecting the axis of the pin.

13. The method of claim 12 wherein the material selected is a stainless steel.

14. The method of claim 12 wherein the blank is curled to form the body of the pin by compressing the same between opposing dies with the tabs projecting from the dies.

15. The method of claim 14 which includes bending the tabs by holding the curled shank endwise between approaching dies which curl the tabs.

16. The method of claim 14 which includes holding the shank between retaining dies having end faces and pressing the curled tabs against said end faces.

17. The method of claim 12 wherein bending the tabs is carried out in two steps, the first step being bending the tabs at one end only whereby the blank, with the other tabs projecting endwise therefrom, may be inserted endwise to join adjacent links of an initial length of chain, the second step being thereafter bending said other tabs.

18. In a chain comprising a series of spaced pairs of pin links, intermediate center links and interconnecting round pins having T-heads, each end of each link having an opening therein which is defined by a semi-circular bearing area near the end referred to and which is elongated toward the center of the link, each end of each pin having oppositely projecting tabs which together form the pin T-head, each joint of the assembled chain including a pin which extends through the aligned openings of two pin links and the opening of an intermediate center link and such that its T-heads overlie the remotely opposite sides of the two pin links and are retained in recesses formed therein, the improvement in such chain wherein the links are made of a material of a selected physical characteristic and the pins are of a smooth surfaced metal selected to provide similar or matching physical characteristics in the pin whereby the chain is of a balanced design, each of said pins being in the form of a hollow cylinder having an axial seam, a selected wall thickness and an outer diameter like that of the link bearing areas, and each end of each pin having two oppositely extending flat tabs which are disposed whereby the tabs at each end lie in a plane perpendicular to the axis of such cylinder, said tabs being of the same metal and integral with the pin and of substantially the same thickness as the wall thickness of the pin.

19. The chain of claim 18 wherein the links are of an iron alloy and the metal material of the pins are of a carbon steel.

20. The chain of claim 19 wherein the carbon steel is relatively ductile for ease of forming and is hardened thereafter by heat treatment for strength and resistance to wear.

21. The chain of claim 18 wherein the links are molded of an engineered plastic such as an acetal resin and the material of the pins is stainless steel.

22. The chain of claim 18 wherein the axial seam is open as in the order of one-sixteenth of an inch and from which foreign material can be readily dislodged by spray cleaning.

23. The chain of claim 18 wherein the tabs of each pin are each disposed in the order of 90° from the seam of the pin and the pin of each joint of the assembled chain is positioned such that the seam is disposed nearer the center of the center link.

24. In the manufacture of lengths of chain of the trolley conveyor type which includes a series of links and connecting pins, the ends of each pin having projecting tabs such that each end of the pin is provided with a T-head, said links having openings through which the pins extend and which are elongated for passage of the T-heads and the disassembly and reassembly of any two adjacent links of the chain which method comprises providing the completed links requisite to each length of chain, providing uncompleted pins having tabs at least at one end of each and which project endwise thereof, positioning each two adjacent completed links and inserting endwise the uncompleted pin, and thereupon completing the pin by bending the tabs referred to such that both ends of the pin are provided with T-heads.

25. The method of claim 24 which includes providing uncompleted pins having first tabs which provide a T-head at one end and second tabs for automated factory assembly which project endwise at the other end and inserting endwise said other end of the uncompleted pin and thereupon bending said second tabs in assembly such that both ends are provided with T-heads.

* * * * *